US011199906B1

(12) United States Patent
Curtis et al.

(10) Patent No.: US 11,199,906 B1
(45) Date of Patent: Dec. 14, 2021

(54) GLOBAL USER INPUT MANAGEMENT (71) Applicant: Amazon Technologies, Inc., Reno, NV (US)

(72) Inventors: Ryan Halley Curtis, Allston, MA (US); Andrew Dean Christian, Lincoln, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 449 days.

(21) Appl. No.: 14/018,331

(22) Filed: Sep. 4, 2013

(51) Int. Cl.
*G06F 3/00* (2006.01)
*G06F 3/01* (2006.01)

(52) U.S. Cl.
CPC .................................. *G06F 3/017* (2013.01)

(58) Field of Classification Search
CPC .. G06F 3/017; G06F 3/0487; G06F 3/01–015; G06F 2200/1637; G06F 3/167; G06F 16/3329; G06F 16/3344; G06F 16/335; G06F 16/41; G06F 2203/0381
See application file for complete search history.

(56) References Cited

U.S. PATENT DOCUMENTS

| | | |
|---|---|---|
| 4,836,670 A | 6/1989 | Hutchinson |
| 4,866,778 A | 9/1989 | Baker et al. |
| 5,563,988 A | 10/1996 | Maes et al. |
| 5,594,469 A | 1/1997 | Freeman et al. |
| 5,616,078 A | 4/1997 | Oh |
| 5,621,858 A | 4/1997 | Stork et al. |
| 5,632,002 A | 5/1997 | Hashimoto et al. |
| 5,960,394 A | 9/1999 | Gould et al. |
| 6,185,529 B1 | 2/2001 | Chen et al. |
| 6,249,763 B1 | 6/2001 | Minematsu |
| 6,266,059 B1 * | 7/2001 | Matthews et al. ............ 715/810 |
| 6,272,231 B1 | 8/2001 | Maurer et al. |
| 6,339,758 B1 | 1/2002 | Kanazawa et al. |
| 6,385,331 B2 | 5/2002 | Harakawa et al. |
| 6,404,438 B1 | 6/2002 | Hatlelid et al. |

(Continued)

FOREIGN PATENT DOCUMENTS

| | | |
|---|---|---|
| CN | 1694045 A | 11/2005 |
| EP | 2365422 A2 * | 9/2011 |

(Continued)

OTHER PUBLICATIONS

Niklfeld, Georg, Robert Finan, and Michael Pucher. "Architecture for adaptive multimodal dialog systems based on voiceXML." INTERSPEECH. 2001.*

(Continued)

*Primary Examiner* — Mahelet Shiberou
(74) *Attorney, Agent, or Firm* — Polsinelli PC (57) ABSTRACT

Systems and approaches enable concurrent interaction with multiple user applications in a multi-tasking environment. User input, such as voice commands, head movement, hand or finger gestures, device motion, can be received to a centralized component of a system. State information for each user application can be determined, and the centralized component can send a recognized command or gesture to the appropriate user application(s) based on the state information and/or rules for propagating user input. Additionally, users can configure the input modalities of each user application to customize interaction with systems.

13 Claims, 6 Drawing Sheets

(56) References Cited

U.S. PATENT DOCUMENTS

| | | | |
|---|---|---|---|
| 6,434,255 B1 | 8/2002 | Harakawa | |
| 6,518,957 B1 * | 2/2003 | Lehtinen | G06F 1/1626 345/168 |
| 6,594,629 B1 | 7/2003 | Basu et al. | |
| 6,633,305 B1 | 10/2003 | Sarfeld | |
| 6,728,680 B1 | 4/2004 | Aaron et al. | |
| 6,750,848 B1 | 6/2004 | Pryor | |
| 6,863,609 B2 | 3/2005 | Okuda et al. | |
| 6,868,383 B1 | 3/2005 | Bangalore et al. | |
| 6,927,694 B1 | 8/2005 | Smith et al. | |
| 6,959,102 B2 | 10/2005 | Peck | |
| 7,039,198 B2 | 5/2006 | Birchfield | |
| 7,069,215 B1 | 6/2006 | Bangalore et al. | |
| 7,082,393 B2 | 7/2006 | Lahr | |
| 7,199,767 B2 | 4/2007 | Spero | |
| 7,257,575 B1 | 8/2007 | Johnston et al. | |
| 7,301,526 B2 * | 11/2007 | Marvit | G06F 1/1626 345/156 |
| 7,379,566 B2 | 5/2008 | Hildreth | |
| 7,401,783 B2 | 7/2008 | Pryor | |
| 7,519,223 B2 | 4/2009 | Dehlin et al. | |
| 7,587,053 B1 | 9/2009 | Pereira | |
| 7,599,712 B2 * | 10/2009 | van der Meulen | H04M 1/7258 341/22 |
| 7,603,143 B2 * | 10/2009 | Kang | H04M 1/0214 455/550.1 |
| 7,613,310 B2 | 11/2009 | Mao et al. | |
| 7,760,248 B2 | 7/2010 | Marks et al. | |
| 7,761,302 B2 | 7/2010 | Woodcock et al. | |
| 7,949,964 B2 | 5/2011 | Vimme | |
| 8,150,063 B2 | 4/2012 | Chen et al. | |
| 8,228,292 B1 * | 7/2012 | Ruiz et al. | 345/156 |
| 8,296,151 B2 | 10/2012 | Klein et al. | |
| 8,432,366 B2 * | 4/2013 | Hodges | G06F 3/041 345/173 |
| 8,700,392 B1 | 4/2014 | Hart et al. | |
| 8,744,645 B1 | 6/2014 | Vaghefinazari et al. | |
| 8,788,977 B2 | 7/2014 | Bezos | |
| 8,892,446 B2 | 11/2014 | Cheyer et al. | |
| 9,007,301 B1 | 4/2015 | Raffle et al. | |
| 9,026,939 B2 * | 5/2015 | Smus | 715/800 |
| 9,035,874 B1 | 5/2015 | Fowers et al. | |
| 9,304,583 B2 | 4/2016 | Bezos | |
| 2002/0135618 A1 | 9/2002 | Maes et al. | |
| 2002/0178344 A1 | 11/2002 | Bourguet et al. | |
| 2002/0194005 A1 | 12/2002 | Lahr | |
| 2003/0023435 A1 * | 1/2003 | Josephson | 704/235 |
| 2003/0023953 A1 * | 1/2003 | Lucassen | G06F 8/38 717/106 |
| 2003/0028382 A1 * | 2/2003 | Chambers | G10L 15/26 704/275 |
| 2003/0083872 A1 | 5/2003 | Kikinis | |
| 2003/0171921 A1 | 9/2003 | Manabe et al. | |
| 2003/0190076 A1 | 10/2003 | Delean | |
| 2004/0046795 A1 * | 3/2004 | Josephson et al. | 345/764 |
| 2004/0080487 A1 * | 4/2004 | Griffin | G06F 1/1626 345/156 |
| 2004/0105573 A1 | 6/2004 | Neumann et al. | |
| 2004/0107103 A1 | 6/2004 | Iyengar et al. | |
| 2004/0122666 A1 | 6/2004 | Alhenius | |
| 2004/0140956 A1 | 7/2004 | Kushler et al. | |
| 2004/0205482 A1 | 10/2004 | Basu et al. | |
| 2004/0260438 A1 * | 12/2004 | Chernetsky | G10L 15/22 701/36 |
| 2005/0064912 A1 | 3/2005 | Yang et al. | |
| 2005/0133693 A1 | 6/2005 | Fouquet et al. | |
| 2005/0212754 A1 * | 9/2005 | Marvit | G06F 1/1626 345/156 |
| 2005/0278467 A1 | 12/2005 | Gupta et al. | |
| 2006/0143006 A1 | 6/2006 | Asano | |
| 2006/0155546 A1 | 7/2006 | Gupta et al. | |
| 2006/0167784 A1 | 7/2006 | Hoffberg et al. | |
| 2006/0197753 A1 * | 9/2006 | Hotelling | G06F 1/1626 345/173 |
| 2006/0224382 A1 | 10/2006 | Taneda | |
| 2007/0002026 A1 * | 1/2007 | Sadler | G06F 3/04895 345/168 |
| 2007/0025555 A1 | 2/2007 | Gonai | |
| 2007/0061148 A1 * | 3/2007 | Cross et al. | 704/275 |
| 2007/0071277 A1 | 3/2007 | Van Der Veen et al. | |
| 2007/0118520 A1 | 5/2007 | Bliss | |
| 2007/0164989 A1 | 7/2007 | Rochford et al. | |
| 2007/0260972 A1 * | 11/2007 | Anderl | 715/513 |
| 2007/0273611 A1 | 11/2007 | Torch | |
| 2008/0005418 A1 | 1/2008 | Julian | |
| 2008/0013826 A1 | 1/2008 | Hillis et al. | |
| 2008/0019589 A1 | 1/2008 | Yoon | |
| 2008/0040692 A1 | 2/2008 | Sunday et al. | |
| 2008/0059578 A1 * | 3/2008 | Albertson | G06F 3/016 709/204 |
| 2008/0072155 A1 * | 3/2008 | Detweiler | G06F 3/0489 715/729 |
| 2008/0136916 A1 | 6/2008 | Wolff | |
| 2008/0141181 A1 * | 6/2008 | Ishigaki | G06F 3/011 715/863 |
| 2008/0158096 A1 | 7/2008 | Breed | |
| 2008/0167868 A1 | 7/2008 | Kanevsky et al. | |
| 2008/0174570 A1 | 7/2008 | Jobs et al. | |
| 2008/0255850 A1 * | 10/2008 | Cross et al. | 704/275 |
| 2008/0262849 A1 | 10/2008 | Buck | |
| 2008/0266257 A1 | 10/2008 | Chiang | |
| 2008/0266530 A1 | 10/2008 | Takahashi et al. | |
| 2008/0276196 A1 | 11/2008 | Tang | |
| 2009/0031240 A1 | 1/2009 | Hildreth | |
| 2009/0079813 A1 | 3/2009 | Hildreth | |
| 2009/0153341 A1 | 6/2009 | Spalink | |
| 2009/0157206 A1 | 6/2009 | Weinberg et al. | |
| 2009/0203408 A1 * | 8/2009 | Athas | G06F 1/1626 455/566 |
| 2009/0216529 A1 | 8/2009 | Bengtssson | |
| 2009/0265627 A1 | 10/2009 | Kim et al. | |
| 2009/0307726 A1 | 12/2009 | Levin et al. | |
| 2009/0313584 A1 | 12/2009 | Kerr | |
| 2010/0030400 A1 * | 2/2010 | Komer | G10L 15/26 701/3 |
| 2010/0063880 A1 | 3/2010 | Atsmon et al. | |
| 2010/0082341 A1 | 4/2010 | Kim | |
| 2010/0092007 A1 | 4/2010 | Sun | |
| 2010/0105443 A1 * | 4/2010 | Vaisanen | 455/566 |
| 2010/0122167 A1 * | 5/2010 | Ryu | G11B 27/34 715/716 |
| 2010/0138224 A1 * | 6/2010 | Bedingfield, Sr. | G10L 15/22 704/275 |
| 2010/0138680 A1 * | 6/2010 | Brisebois | G06F 1/1626 713/324 |
| 2010/0179811 A1 | 7/2010 | Gupta et al. | |
| 2010/0188328 A1 * | 7/2010 | Dodge | G06F 3/04883 345/156 |
| 2010/0188426 A1 | 7/2010 | Ohmori et al. | |
| 2010/0208914 A1 | 8/2010 | Ohtsuka | |
| 2010/0233996 A1 | 9/2010 | Herz et al. | |
| 2010/0238323 A1 | 9/2010 | Englund et al. | |
| 2010/0241431 A1 | 9/2010 | Weng et al. | |
| 2010/0280983 A1 | 11/2010 | Cho et al. | |
| 2010/0283735 A1 * | 11/2010 | Kim | G06F 3/0488 345/168 |
| 2010/0328319 A1 | 12/2010 | Ikenoue | |
| 2010/0332229 A1 * | 12/2010 | Aoyama | H04N 5/232 704/251 |
| 2011/0032182 A1 * | 2/2011 | Kim | G06F 3/0489 345/156 |
| 2011/0032845 A1 | 2/2011 | Agapi et al. | |
| 2011/0035058 A1 * | 2/2011 | Clough | G10L 17/00 700/275 |
| 2011/0055846 A1 * | 3/2011 | Perez | G06F 3/04842 719/313 |
| 2011/0071830 A1 | 3/2011 | Kim et al. | |
| 2011/0112921 A1 | 5/2011 | Kennewick et al. | |
| 2011/0164105 A1 | 7/2011 | Lee et al. | |
| 2011/0184735 A1 | 7/2011 | Flaks et al. | |
| 2011/0193939 A1 * | 8/2011 | Vassigh et al. | 348/46 |
| 2011/0205156 A1 * | 8/2011 | Gomez et al. | 345/157 |

(56) References Cited

U.S. PATENT DOCUMENTS

| | | | |
|---|---|---|---|
| 2011/0244924 A1* | 10/2011 | Jung | G06F 3/0481 455/566 |
| 2011/0254691 A1 | 10/2011 | Ooi et al. | |
| 2011/0270609 A1 | 11/2011 | Jones et al. | |
| 2011/0285807 A1 | 11/2011 | Feng | |
| 2011/0291926 A1* | 12/2011 | Gokturk | G06F 3/017 345/158 |
| 2011/0313768 A1 | 12/2011 | Klein et al. | |
| 2012/0015674 A1* | 1/2012 | LeBeau | G06F 16/957 455/456.3 |
| 2012/0030637 A1* | 2/2012 | Dey et al. | 715/863 |
| 2012/0057064 A1 | 3/2012 | Gardiner et al. | |
| 2012/0131098 A1 | 5/2012 | Wood et al. | |
| 2012/0221929 A1* | 8/2012 | Bolsinga | G06F 3/04886 715/205 |
| 2012/0257121 A1 | 10/2012 | Yeh et al. | |
| 2012/0280900 A1 | 11/2012 | Wang et al. | |
| 2012/0304132 A1* | 11/2012 | Sareen | G06F 3/04883 715/863 |
| 2013/0016129 A1* | 1/2013 | Gossweiler, III et al. | 345/667 |
| 2013/0021240 A1 | 1/2013 | Coulon | |
| 2013/0044080 A1* | 2/2013 | Chiang | 345/174 |
| 2013/0050131 A1* | 2/2013 | Lee et al. | 345/174 |
| 2013/0050263 A1* | 2/2013 | Khoe et al. | 345/634 |
| 2013/0050458 A1* | 2/2013 | Kim | G06F 3/011 348/77 |
| 2013/0053007 A1* | 2/2013 | Cosman | H04W 4/21 455/414.3 |
| 2013/0063346 A1 | 3/2013 | Fletcher-Proce | |
| 2013/0127719 A1* | 5/2013 | Yasutake | 345/163 |
| 2013/0138424 A1 | 5/2013 | Koenig et al. | |
| 2013/0169530 A1 | 7/2013 | Bhaskar et al. | |
| 2013/0182914 A1 | 7/2013 | Sakai et al. | |
| 2013/0187855 A1* | 7/2013 | Radakovitz et al. | 345/163 |
| 2013/0190054 A1 | 7/2013 | Kulas | |
| 2013/0191779 A1* | 7/2013 | Radakovitz et al. | 715/800 |
| 2013/0207898 A1* | 8/2013 | Sullivan | G06F 3/167 345/163 |
| 2013/0227419 A1* | 8/2013 | Lee | G06F 3/04883 715/728 |
| 2013/0265437 A1* | 10/2013 | Thorn et al. | 348/164 |
| 2013/0293488 A1 | 11/2013 | Na et al. | |
| 2013/0304479 A1 | 11/2013 | Teller et al. | |
| 2013/0311508 A1* | 11/2013 | Denker et al. | 707/769 |
| 2013/0332160 A1 | 12/2013 | Posa | |
| 2013/0342480 A1* | 12/2013 | Moon et al. | 345/173 |
| 2013/0344859 A1* | 12/2013 | Abramson et al. | 455/418 |
| 2014/0007019 A1 | 1/2014 | Saukko et al. | |
| 2014/0043229 A1 | 2/2014 | Higaki | |
| 2014/0050370 A1 | 2/2014 | Inkumsah et al. | |
| 2014/0132505 A1 | 5/2014 | Vennelakanti et al. | |
| 2014/0168074 A1 | 6/2014 | Lim et al. | |
| 2014/0210727 A1* | 7/2014 | Wassingbo | G06F 3/0488 345/173 |
| 2014/0214415 A1 | 7/2014 | Klein | |
| 2014/0223384 A1 | 8/2014 | Graumann et al. | |
| 2014/0282272 A1* | 9/2014 | Kies | G06F 3/013 715/863 |
| 2014/0337016 A1 | 11/2014 | Herbig et al. | |
| 2015/0019227 A1* | 1/2015 | Anandarajah | 704/257 |
| 2015/0161992 A1 | 6/2015 | Jung | |

FOREIGN PATENT DOCUMENTS

| | | |
|---|---|---|
| EP | 2365422 A3 * | 1/2015 |
| GB | 2350712 | 12/2000 |
| GB | 2440348 | 1/2008 |
| JP | 2002-164990 | 6/2002 |
| JP | 2002-351603 | 12/2002 |
| JP | 2004-318826 | 11/2004 |
| JP | 2007-121489 | 5/2007 |
| JP | 2008-97220 | 4/2008 |
| JP | 2008-186247 | 8/2008 |
| WO | 02/015560 A3 | 2/2002 |
| WO | 06/036069 A1 | 4/2006 |
| WO | WO 2012093779 A2 * | 7/2012 |
| WO | WO 2013021385 A2 * | 2/2013 |
| WO | WO 2013021385 A3 * | 10/2013 |

OTHER PUBLICATIONS

D. Weimer and S. K. Ganapathy. 1989. A synthetic visual environment with hand gesturing and voice input. In Proceedings of the SIGCHI Conference on Human Factors in Computing Systems (CHI '89), K. Bice and C. Lewis (Eds.). ACM, New York, NY, USA, 235-240. DOI=http://dx.doi.org/10.1145/67449.67495.*

"Non Final Office Action dated Oct. 6, 2014" U.S. Appl. No. 14/298,577, 9 pages.

"Non Final Office Action dated Oct. 8, 2014" U.S. Appl. No. 12/902,986, 37 pages.

"Non Final Office Action dated Aug. 8, 2014" U.S. Appl. No. 13/791,265, 25 pages.

"Third Office Action dated Jun. 3, 2014" China Application 20098014641.0, 17 pages.

"International Supplementary Search Report dated Jul. 23, 2014" Europe Application 09828299.9, 16 pages.

"International Supplementary Search Report dated Aug. 19, 2014" Europe Application 09828299.9, 3 pages.

"Reexamination Report dated Sep. 9, 2014" Japan Application 2011-537661, 3 pages.

Nokia N95 8GB Data Sheet, Nokia, 2007, 1 page.

"Face Detection: Technology Puts Portraits in Focus", Consumerreports.org, http://www.comsumerreports.org/cro/electronics-computers/camera-photograph/cameras, 2007, 1 page.

"Final Office Action dated Oct. 27, 2011", U.S. Appl. No. 12/332,049, 66 pages.

"Final Office Action dated Feb. 26, 2013", U.S. Appl. No. 12/879,981, filed Feb. 26, 2013, 29 pages.

"Final Office Action dated Apr. 16, 2013", U.S. Appl. No. 12/902,986, filed Apr. 16, 2013, 31 pages.

"Final Office Action dated Jun. 6, 2013", U.S. Appl. No. 12/332,049, 70 pages.

"First Office Action dated Mar. 22, 2013", China Application 200980146841.0, 40 pages.

"International Search Report dated Apr. 7, 2010", International Application PCT/US09/65364, dated Apr. 7, 2010, 2 pages.

"International Written Opinion dated Apr. 7, 2010", International Application PCT/US09/65364, Apr. 7, 2010, 7 pages.

"Introducing the Wii MotionPlus, Nintendo's Upcoming Accessory for The Revolutionary Wii Remote at Nintendo:: What's New", Nintendo Games, http://www.nintendo.com/whatsnew/detail/eMMuRj_N6vntHPDycCJAKWhE09zBvyPH, Jul. 14, 2008, 2 pages.

"Non Final Office Action dated Nov. 13, 2012", U.S. Appl. No. 12/879,981, filed Nov. 13, 2012, 27 pages.

"Non Final Office Action dated Nov. 7, 2012", U.S. Appl. No. 12/332,049, 64 pages.

"Non Final Office Action dated Dec. 26, 2012", U.S. Appl. No. 12/902,986, filed Dec. 26, 2012, 27 pages.

"Non Final Office Action dated Apr. 2, 2013", Japan Application 2011-537661, 2 pages.

"Non Final Office Action dated Jun. 11, 2011", U.S. Appl. No. 12/332,049, 53 pages.

"Notice of Allowance dated May 13, 2013", U.S. Appl. No. 12/879,981, filed May 13, 2013, 9 pages.

"Office Action dated May 13, 2013", Canada Application 2,743,914, 2 pages.

Blimes, Jeff A. , "A Gentle Tutorial of the EM Algorithm and its Application to Parameter Estimation for Gaussian Mixture and Hidden Markov Models", International Computer Science Institute 4, No. 510, Email from D. Nguyen to J.O'Neill (Amazon) sent Jun. 5, 2013, 1998, 15 pages.

Brashear, Helene et al., "Using Multiple Sensors for Mobile Sign Language Recognition", International Symposium on Wearable Computers, 2003, 8 pages.

Cornell, Jay , "Does this Headline Know You're Reading It?", h+Magazine,located at <located at <http:l/hplusmagazine.comiarticles/

(56) References Cited

OTHER PUBLICATIONS ai/does-headline-know-you%E2%80%99re-reading-it>, last accessed on Jun. 7, 2010, Mar. 19, 2010, 4 pages.

Haro, Antonio et al., "Mobile Camera-Based Adaptive Viewing", MUM '05 Proceedings of the 4th International Conference on Mobile and Ubiquitous Mulitmedia., 2005, 6 pages.

Padilla, Raymond , "Eye Toy (PS2)", <http://www.archive.gamespy.com/hardware/august03/eyetoyps2/index.shtml, Aug. 16, 2003, 2 pages.

Purcell, , "Maximum Liklihood Estimation Primer", http://statgen.iop.kcl.ac.uk/bgim/mle/sslike_1.html, May 20, 2007.

Schneider, Jason , "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.

Tyser, Peter , "Control an iPod with Gestures", http://www.videsignline.com/howto/170702555, Sep. 11, 2005, 4 pages.

Valin, Jean-Marc et al., "Robust Sound Source Localization Using a Microphone Array on a Mobile Robot", Research Laboratory on Mobile Robotics and Intelligent Systems; Department of Electrical Engineering and Computer Engineering; Universite de Sherbrooke, Quebec, Canada, 9 pages.

Van Veen, Barry D et al., "Beamforming A Versatile Approach to Spatial Filtering", IEEE ASSP Magazine, 1988.

Yang, Ming-Hsuan et al., "Detecting Faces in Images: A Survey", IEEE Transactions on Pattern Analysis and Machine Intelligence, vol. 24, No. 1, 2002, pp. 34-58.

Zyga, Lisa , "Hacking the Wii Remote for Physics Class", PHYSorg.com, http://www.physorg.com/news104502773.html, Jul. 24, 2007, 2 pages.

Faceshift Documentation: Faceshift Studio Beta, http://www.faceshift.com/help/studio/beta/,2012.

Final Office Action dated Oct. 23, 2013; in corresponding U.S. Appl. No. 12/786,297.

International Preliminary Examination Reporton Patentability dated Oct. 17, 2013; in corresponding PCT patent application No. PCT/US2012/032148.

Non-Final Office Action dated Mar. 28, 2013; in corresponding U.S. Appl. No. 12/786,297.

Cappelletta, Luca et al.; "Phoneme-to Viseme mapping for visual speech recognition", Department of Electronic and Electrical Engineering, Trinity College Dublin, Ireland, 2012.

Hartley, Richard et al.; "Multiple View Geometry in Computer Vision", vol. 2; Cambridge, 2000.

Horn, Berthold et al.; "Determining Optical Flow", Artificial Intelligence 17, No. 1, 1981, pp. 185-203.

Lucas, Bruce et al. ; "An Iterative Image Registration Technique with an application to stereo vision", Proceedings of the 7th International Conference on Artificial Intelligence (IJCAI) Aug. 24-28, 1981; Vancouver, British Columbia, 1981, pp. 674-679.

Vanden Berg, Thomas,; "Near Infrared Light Absorption in the Human Eye Media", Vision Res., vol. 37, No. 2. 1997, pp. 249-253.

Notice of Allowance and Fee(s) Due dated Jan. 6, 2014; in corresponding U.S. Appl. No. 12/879,981.

Notice of Allowance and Fee(s) Due dated Mar. 4, 2014; in corresponding U.S. Appl. No. 12/332,049.

Hjelmas, Erik, et al., "Face Detection: A Survey," Computer Vision and Image Understanding 83, No. 3, 2001, pp. 236-274 (previously listed in the IDS filed Nov. 11, 2013 but lined through in the corresponding 1449 because document was omitted).

* cited by examiner

GLOBAL USER INPUT MANAGEMENT

BACKGROUND

As personal electronic devices, such as laptop computers, tablets, smartphones, or portable media players, become increasingly sophisticated, people are able to interact with such devices in new and interesting ways. For example, some personal electronic devices are capable of detecting touches and other touch-based gestures, such as by capacitive touch sensors incorporated in a touchscreen. The tap of a virtual key of a soft keyboard displayed on the touchscreen may correspond to entry of the key into a device. A swipe of the touchscreen may navigate a user to a different portion of a graphical user interface presented on the touchscreen. Other devices can detect device motion via inertial sensors, such as accelerometers, gyroscopes, magnetometers, and/or inclinometers, and perform actions based on the detected motion. For instance, a device can detect a rotation of the device of approximately ninety degrees, interpret such motion as an intent of the user to change the orientation of content being displayed on the device from portrait mode to landscape mode (or vice versa), and re-display the content according to the changed orientation of the device. As electronic devices become more powerful and capable of sensing more of the world around them, new approaches can be developed for users to interact with such devices.

BRIEF DESCRIPTION OF THE DRAWINGS

Various embodiments in accordance with the present disclosure will be described with reference to the drawings, in which.

DETAILED DESCRIPTION

In certain situations, users may desire to interact concurrently with multiple applications in a multi-tasking environment. Conventional systems and approaches may support multi-tasking, wherein a device can provide for concurrent execution of multiple user applications. However, conventional devices and techniques may be limited to direct interaction with a single application at a time. For example, a user may be operating a first user application, such as a web browser or an email application, while a music player application is concurrently executing. At a particular point in time, the user may wish to replay a song or skip a song playing on the music player. In conventional systems and approaches, the user may be required to halt interaction with the first user application, select the music player as the active or foreground application, direct the music player to replay the song or skip the song, and re-select the first user application to continue interacting with the first user application. As another example, the user may be interacting with a first user application while a second user application is concurrently running in the background. The user may change the orientation of a first graphical user interface corresponding to the first user application, such as by tilting the device to a new orientation. The user may then switch to operation of the second user application. In conventional devices and approaches, a second graphical user interface corresponding to the second user application may not immediately reflect the new orientation of the device. Instead, the user may have to re-tilt the device and/or there may be a delay associated with re-determining the new orientation of the device and re-displaying the second graphical interface to comport with the new orientation.

Systems and methods in accordance with various embodiments of the present disclosure may overcome one or more of the aforementioned and other deficiencies experienced in conventional approaches for managing user gestures and commands in a multi-tasking environment. In particular, various embodiments enable concurrent interaction with multiple applications in a multi-tasking environment via a global user input detection and management system. A device operating according to various embodiments can be configured to recognize an assortment of gestures and commands, such as touch-based gestures (e.g., taps, swipes, or other pointer gestures), auditory commands (e.g., voice commands, whistles, finger snaps), device motions and/or orientations (e.g., rotations or translations of the device, device gestures), visual gestures (e.g., hand gestures, facial movements, body movements), among others. User input recognition can be centralized instead of on an ad-hoc application-by-application basis. In this manner, gestures and commands may be better managed. For example, after a particular user input has been received and recognized, the device can determine a state of each user application currently executing on the device, including the types of input each user application supports.

A type of user input is a category of commands or gestures supported by an application, such as audio commands, touch gestures, device gestures, or visual gestures. A type of input can correspond to one more sensors or input devices. For example, audio or voice commands may be associated with a microphone, touch gestures may be associated with one or more touch sensors, device gestures may be associated with accelerometers, gyroscopes, magnetometers, and visual gestures may be associated with one more cameras or other optical input devices. It will be appreciated that certain types of user inputs may correspond to sensors or other input devices that are also associated with other types of use inputs. For instance, in certain embodiments, voice commands may be based on audio data captured by a microphone and image data of a user's lip movement captured by one or more cameras, which can be used to enhance voice recognition. Other sensors and input devices whose data can be influenced by a user or whose data can provide additional context for command/gesture recognition can also be used in various embodiments, such as thermal sensors (e.g., the user placing a device closer or further away from the user's body), location determination components (e.g., GPS, cellular network system, radio frequency (RF) antenna, NFC antenna, Bluetooth®, altimeter), ambient light sensors (e.g., influencing cameras and optical sensors), among others.

In various embodiments, a computing device can be configured to intelligently distribute user input received to the device to an appropriate application. The device may process a set of rules for propagating user input and select at least one of the user applications for receiving the recognized gesture or command based on the state of each user application and the propagation rules. In one embodiment, a user may be concurrently operating multiple applications on a computing device, with a first user application running in the foreground and a second user application running in the background. The user may change the orientation of content being displayed by the first user application by tilting the device. The new orientation of the device can be propagated to each user application configured to receive and recognize such user input. Instead of each user application having to re-execute code (separate or shared) to ascertain the orientation of the device, determination of the orientation of the device can occur once and be distributed to interested applications. This may reduce processing by the computing device and increase battery life. Further, there may be less latency associated with the change in the orientation of the second graphical user interface such that the device may be more responsive than conventional systems and techniques.

As another example, a user may be operating multiple applications in multiple windows, such as a video game in one window and an email application in a second window. The game may be a first-person perspective game wherein navigation is based on device motion (e.g., tilting the device forward, backward, right, or left causes the video game character to move forward, backward, right, or left, respectively). The email application may also include a motion-based interface. The user may interact with the email application by performing certain gestures with the device (e.g., tilting the device forward may cause an email to be opened, tilting the device to the right may result in selection of a next email, and tilting the device to the left may result in selection of a previous email). In an embodiment, a tilt of the device may be passed to the video game for consumption by the video game because propagation rules may prioritize the video game for receiving such user input. The video game may be paused, however, and the device motion may be distributed to the email application instead.

An electronic device that implements a global approach for handling user input may also improve device power usage by exercising greater control over activation and deactivation of cameras, sensors, and other input devices. Thus, a user application may request that certain types of user input or input modalities be available in specific instances. For example, an application may indicate that certain types of user input or input modalities must be available when the application is running (e.g., the user has launched the application and the application is running but could be running in the background), when the application is visible on the screen, or when the application has focus (e.g., the application is displayed on the screen and has priority over other applications for receiving input). The device could maintain state information for each executing user application and activate/deactivate sensors and other input devices based on the execution state of an application (e.g., the application is running, displayed, or focused). It will be appreciated that in at least some embodiments, multiple applications can be running and displayed simultaneously. In at least some embodiments, a user application may have focus but may not necessarily be displayed at the top-most layer of a graphical user interface. For example, a first user application may retain focus even when a pop-up window overlays the first user application. In some embodiments, whether a particular application has focus may also depend on input modality. For instance, a first user application may have focus with respect to visual gestures and a second user application may have focus with respect to entry via a keyboard.

As another example, a user application may have an interface that is based on visual gestures. The device may keep a camera turned on and continuously sample image data while the application is executing to monitor for a visual gesture from a user. This may quickly drain the battery of the device, especially if multiple applications are concurrently executing. A global user input management system could utilizes a different approach that uses power more efficiently, such as sampling images at a lower resolution, sampling over longer periods of time until an initial user motion is detected, sampling only portions of images, among other techniques. Alternatively, or in addition, the device could monitor a remaining amount of battery life and implement a more power-efficient approach for recognizing user input when the battery life is low.

Various other functions and advantages are described and suggested below in accordance with the various embodiments.

Figure 1A:
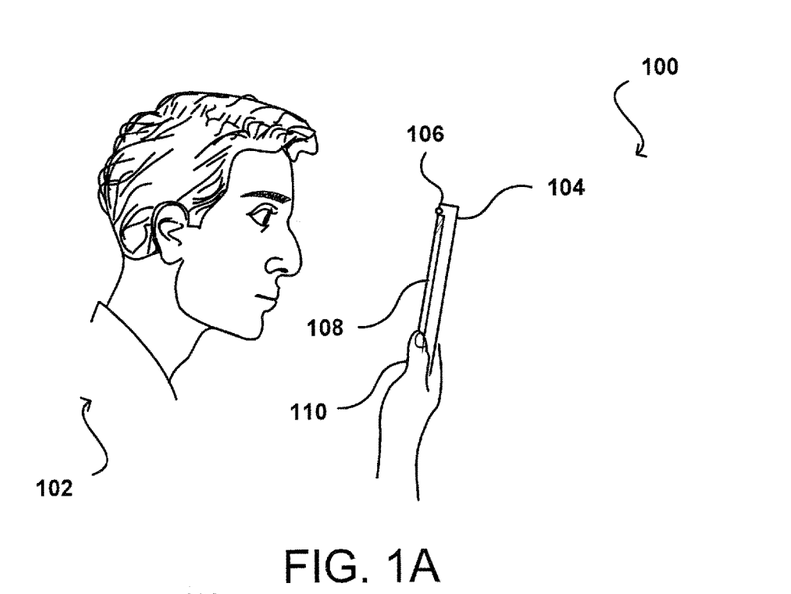
FIGS. 1A-1B illustrate an example approach of detecting and managing various user inputs in accordance with an embodiment.
Figure 1B:
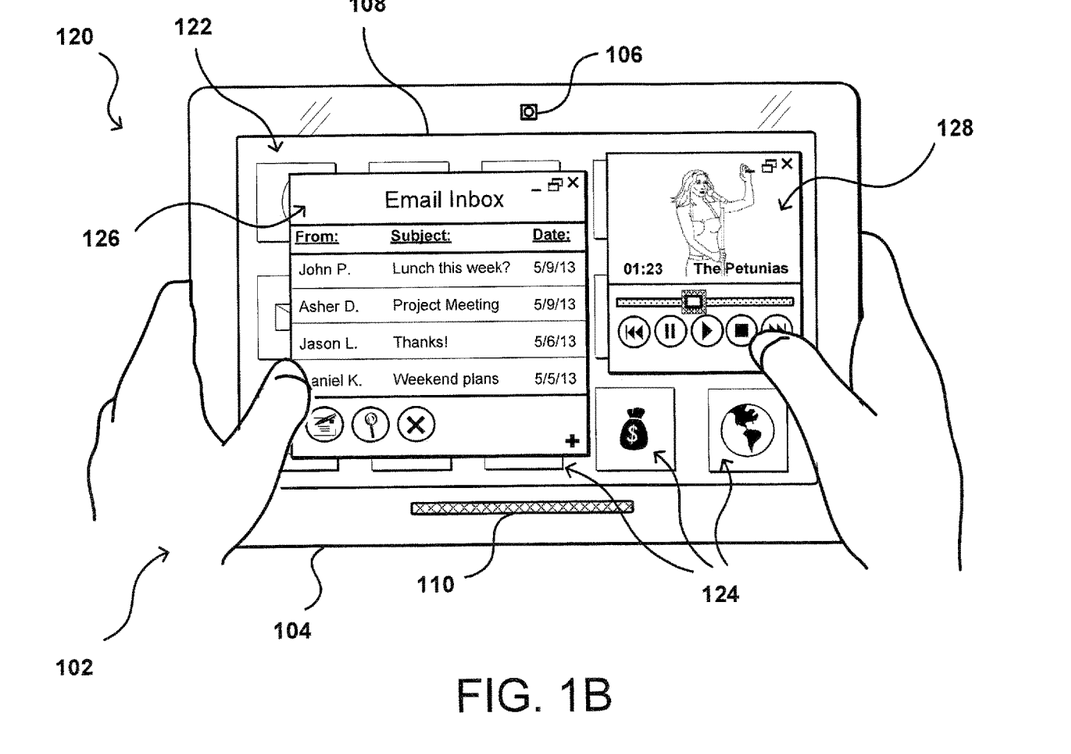

FIGS. 1A-1B illustrate an example approach for detecting and managing various user inputs in accordance with an embodiment. In the example 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The display screen 108 is a touchscreen comprising a plurality of capacitive touch sensors and capable of detecting the user's fingertip touching points of the screen as input for the device. In other embodiments, the display element may implement a different touch technology (e.g., resistive, optical, ultrasonic).

In this example, the computing device includes at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alterative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

In this example, although not visible from the exterior of the device, the computing device also includes one or more motion or orientation determination elements, such as accelerometers, gyroscopes, magnetometers, inclinometers, proximity sensors, distance sensors, depth sensors, range finders, ultrasonic transceivers, among others. In other embodiments, motion or orientation can be determined using image analysis techniques. In still other embodiments, a combination of approaches, such as one or more techniques based on inertial sensors and one or more image analysis techniques can be aggregated or fused to estimate motion of the device.

The computing device 100 also includes one or more microphones 110 or other audio capture components capable of capturing audio data, such as words spoken by the user 102 of the device. In this example, the microphone 110 is placed on the same side of the device 100 as the display screen 108, such that the microphone 110 will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device. In other embodiments, a computing device may include multiple microphones to capture 3D audio. In at least some embodiments, a computing device can also include an audio output element, such as internal speakers or one or more ports to support peripheral audio output components, such as headphones or loudspeakers.

FIG. 1B illustrates an example 120 of the contents displayed on touchscreen 108 of computing device 104. In particular, a home screen 122 with application icons 124 can be seen overlaid by email application 126 and music player 128. In this example, home screen application 122, email application 126, and music player 128 each include a respective touch-based interface enabling a user to interact with each application by tapping interface elements or performing other touch gestures. Conventional pointer-based user interfaces, such as those enabling control via a user's finger, a stylus, a mouse, a pointing stick, a track pad, among others, can be utilized for a multi-tasking platform, but user interaction may be limited to a certain extent. For instance, physical pointers (e.g., user's finger, stylus) and virtual pointers (e.g., mouse, pointing stick, track pad) may confine user interaction to a graphical user interface or window corresponding to a single application. A tap of a physical pointer or a click by a virtual pointer located at a particular region within a conventional pointer-based user interface may only enable the user to control one of the home screen application, email application, or music player corresponding to the region with which the user interacted. Electronic devices are incorporating new types of sensors and other input mechanisms that enable user interactions that are not limited to the windows, icons, menus, pointer paradigm. Further, in certain situations, the user 102 may desire to interact with any one of user applications 122, 126, and 128 without necessarily having to first select one of the applications as the active application or the foreground application.

Approaches in accordance various embodiments enable concurrent interaction with multiple applications in a multi-tasking environment. For example, a user may wish to interact with any one of applications 122, 126, and 128 by voice command, such as "Start up App A" for the home screen application, "Create a new email message" for the email application, or "Play the next song" for the music player. As another example, home screen application 122 may be configured to recognize the gaze of the user with respect to the device as input, such as for rendering the content of the home screen according to the user's gaze, and music player 128 may support hand or finger gestures. Shaking a thumb in front of the camera 106 in a leftward direction can cause the selection of a previous track of an album being played by the music player, shaking the thumb in a rightward direction can cause selection of the next track, shaking the thumb upward may cause the current track to be played, shaking the thumb downward may cause the music player to stop playing the current track, and shaking an open palm toward the front of the camera may cause the music player to pause the current track. In some embodiments, the device may be capable of concurrently recognizing head tracking gestures and hand gestures to enable the user to cause the contents of the home screen to be rendered according to a new direction of his gaze and perform thumb gestures to control music playback at substantially the same time. In other embodiments, the device can recognize a particular type of user input (e.g., one of facial movement or hand/finger gesture) and forward the user input to the appropriate user application for receiving the recognized user input. User input distribution may be based on propagation rules and/or a respective state of each user application, as discussed elsewhere herein.

It will be appreciated that other embodiments may recognize various other types of user gestures and commands as input for a computing device. In some embodiments, head or facial movements can be recognized as user input. Approaches for recognizing facial expressions or movements as input for a computing device are discussed in co-pending U.S. patent application Ser. No. 12/332,049, filed Dec. 8, 2010, entitled, "Movement Recognition as Input Mechanism," which is incorporated by reference herein. Further, other facial features, such as a user's eyes, mouth, nose, or other facial features, can be analyzed over a set of images to determine whether changes in the user's facial features correspond to user input. For example, eye winks, patterns of eye winks, or other ocular motions can be recognized by a computing device to perform various actions. Approaches for detecting a user's eye movements as input for a computing device are discussed in co-pending U.S. patent application Ser. No. 13/791,265, filed Mar. 7, 2013, entitled, "User Eye Input to Display Content," which is incorporated by reference herein. In addition, some embodiments can detect other bodily movements, such as motion of the arms, legs, and/or other parts of a user, as input for a computing device. Approaches for detecting bodily movements as user input for a computing device are discussed in co-pending U.S. patent application Ser. No. 13/914,306, filed Jun. 10, 2013, entitled, "Dynamic User Detection and Tracking," which is incorporated by reference herein.

In some embodiments, a device may include one or more microphones for capturing audio data. The device may be capable of analyzing the received audio data to recognize auditory commands, such as voice commands, whistles, hand claps, finger snaps, among others. Approaches for recognizing auditory commands as user input are discussed in allowed U.S. patent application Ser. No. 12/879,981, filed Sep. 10, 2010, entitled, "Speech-Inclusive Device Interfaces," which is incorporated by reference herein. In at least some embodiments, voice command recognition may be enhanced based on image analysis techniques performed on image data captured of the user's mouth or other user motion (e.g., nodding or shaking of the user's head). Such approaches are discussed in co-pending U.S. patent application Ser. No. 13/626,580, filed Sep. 25, 2012, entitled, "Gesture and Vocalization Recognition," which is incorporated by reference herein.

As mentioned, in some embodiments, motion of a computing device can be recognized as user input. In at least some embodiments, motion of the device can be detected using one or more inertial sensors, such as accelerometers, gyroscopes, and/or magnetometers. In other embodiments, motion of the device can be estimated based on analyzing one or more objects captured over a sequence of images using image analysis techniques such as block-matching, optical flow, phase correlation, feature-based methods, among others. In still other embodiments, data from cameras, inertial sensors, and other input devices can be combined using sensor fusion techniques to estimate motion of the device. These various approaches are discussed in co-pending U.S. patent application Ser. No. 13/965,126, filed Aug. 12, 2013, entitled, "Robust User Detection and Tracking," which is incorporated by reference herein.

Figure 2:
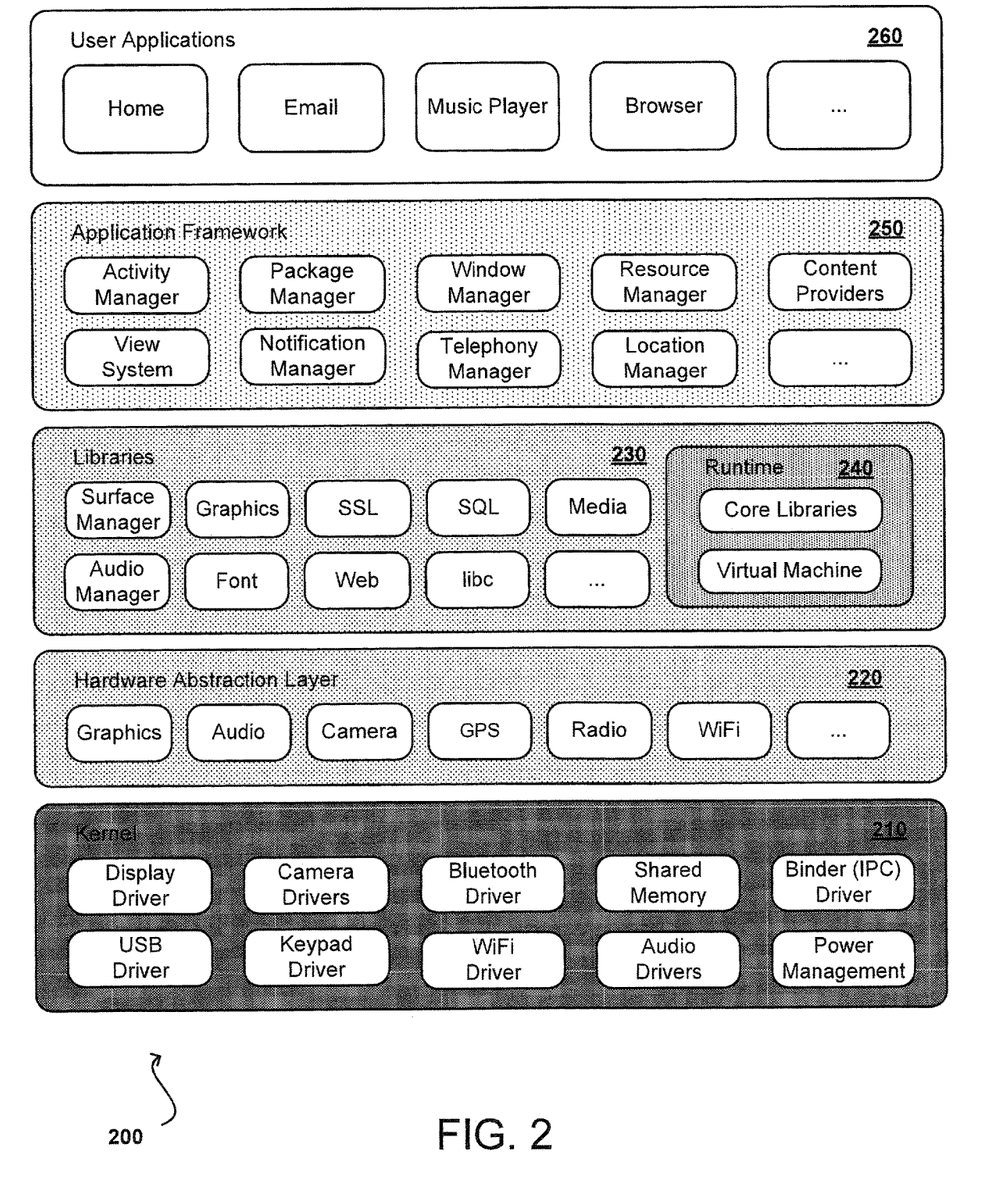
FIG. 2 illustrates an example of a software architecture that can be used in accordance with an embodiment.

FIG. 2 illustrates an example of software architecture 200 for a personal computing device that can be used in accordance an embodiment. Software architecture 200 may be based on the open-source Android® platform, but it will be appreciated that other platforms can be utilized in various embodiments, such as iOS®, Windows Phone®, Blackberry®, webOS®, among others. At the bottom of the software stack 200 resides the kernel 210, which provides a level of abstraction between the hardware of the device and the upper layers of the software stack. In an embodiment, the kernel 210 may be based on the open-source Linux® kernel. The kernel 210 may be responsible for providing low level system services such as the driver model, memory management, process management, power management, networking, security, support for shared libraries, logging, among others.

The next layer in the software stack 200 is the system libraries layer 230 which can provide support for functionality such as windowing (e.g., Surface Manager), 2D and 3D graphics rendering, Secure Sockets Layer (SSL) communication, SQL database management, audio and video playback, font rendering, webpage rendering, System C libraries, among others. In an embodiment, system source libraries layer 230 can comprise open source libraries such as Skia Graphics Library (SGL) (e.g., 2D graphics rendering), Open Graphics Library (OpenGL) or OpenGL for Embedded Systems (OpenGL ES) (e.g., 3D graphics rendering), Open SSL (e.g., SSL communication), SQLite (e.g., SQL database management), Free Type (e.g., font rendering), WebKit (e.g., webpage rendering), and libc (e.g., System C libraries). In this example, the system libraries layer 230 can also include a hardware abstraction layer 220 comprising of a set of interfaces that hardware drivers are required to implement. Each hardware interface may loaded by the system at runtime on an as needed basis. The hardware abstraction layer 220 can provide interfaces for hardware components of a computing device, such as the graphics card, audio card, cameras, GPS, radio frequency (RF) modem, WiFi antenna, among others.

Located on the same level as the system libraries layer is the runtime layer 240, which can include core libraries and the virtual machine engine. In an embodiment, the virtual machine engine may be based on Dalvik®. The virtual machine engine provides a multi-tasking execution environment that allows for multiple processes to execute concurrently. Each application running on the device is executed as an instance of a Dalvik® virtual machine. To execute within a Dalvik® virtual machine, application code is translated from Java® class files (.class, .jar) to Dalvik® bytecode (.dex). The core libraries provide for interoperability between Java® and the Dalvik® virtual machine, and expose the core APIs for Java®, including data structures, utilities, file access, network access, graphics, among others.

The application framework 250 comprises a set of services through which user applications interact. These services manage the basic functions of a computing device, such as resource management, voice call management, data sharing, among others. In particular, the Activity Manager controls the activity life cycle of user applications. The Package Manager enables user applications to determine information about other user applications currently installed on a device. The Window Manager is responsible for organizing contents of a display screen. The Resource Manager provides access to various types of resources utilized by user application, such as strings and user interface layouts. Content Providers allow user applications to publish and share data with other user applications. The View System is an extensible set of views used to create user interfaces for user applications. The Notification Manager allows for user applications to display alerts and notifications to end users. The Telephony Manager manages voice calls. The Location Manager provides for location management, such as by GPS or cellular network. Other hardware managers in the application framework 250 include the Bluetooth Manager, WiFi Manager, USB Manager, Sensor Manager, among others (not shown here).

Located at the top of the software stack 200 are user applications, such as the home screen application, email application, music player, web browser, among others.

Figure 3:
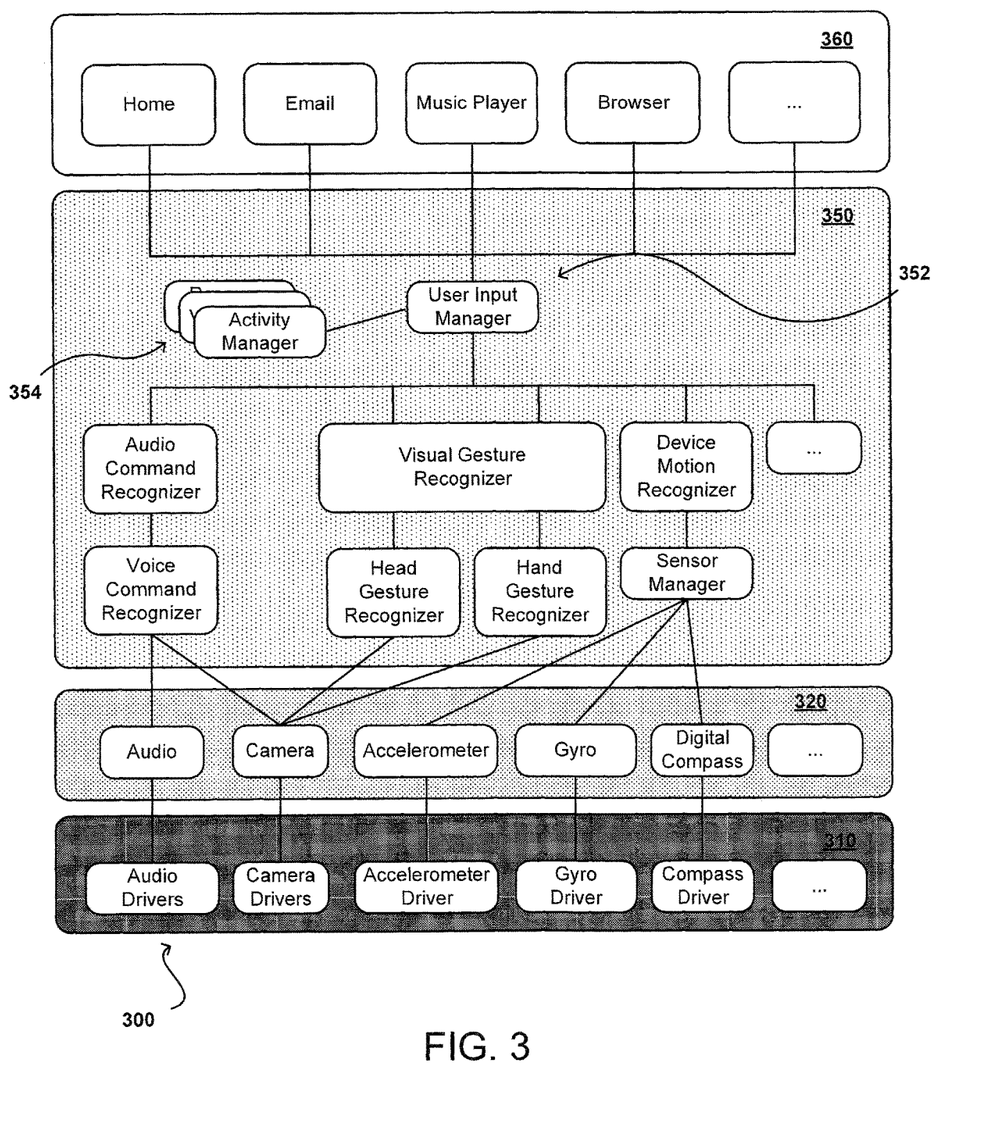
FIG. 3 illustrates an example system for detecting and managing various user inputs in accordance with an embodiment.

FIG. 3 illustrates an example of a system for detecting and managing various user inputs in an environment. In this example, the software stack 300 may comprise at least some similar elements to software architecture 200 of FIG. 2, including kernel 310, core libraries 320 including a hardware abstraction layer, application framework 350, and user application layer 360. As will be appreciated, although software architecture 200 of FIG. 2 is used for purposes of explanation, different software stacks may be used, as appropriate, to implement various embodiments. A global user input management system can be implemented as a system service in the application framework layer 350. Centralizing user input detection and recognition can have certain advantages over conventional approaches that perform user input detection and recognition on an ad-hoc application-by-application basis. Code for implementing user input detection and recognition can be shared, which may result in less processing by a computing device. Latency can be improved because there may be less competition for sensors and other hardware input components. Further, such an approach can facilitate concurrent interaction with multiple applications in a multi-tasking environment.

User applications, such as a home screen application, email application, music player, browser, among others, can interface with the User Input Manager service 352, including registering/unregistering the input modalities supported by each user application, defining the rules by which each user application receives gestures or commands, and providing information about the state of each application. The User Input Manager 352 may interact with other components 354 within the application framework 350, such as to determine state information for applications currently executing on a device. These other components 354 may include the Activity Manager, Package Manager, Window Manager, Resource Manager, View System, Notification Manager, Telephony Manager, Location Manager, among others. The global user input management system can include an extensible set of recognizers for the various types of inputs or modalities supported by a computing device, such as an Audio Command Recognizer, Visual Gesture Recognizer, and Device Motion Recognizer. The system can be extended to include new types of recognizers for other sensors and input devices of a computing device. Further, each of the recognizers can be extended in various embodiments. In this example, the system includes a Voice Command Recognizer which extends from the Audio Command Recognizer and a Head Gesture Recognizer and a Hand Gesture Recognizer which each extend from the Visual Gesture Recognizer. The recognizers interface with components of the hardware abstraction layer to detect and recognize user input. In various embodiments, recognizers can fuse data from multiple sensors to more accurately detect and recognize user gestures and commands. Here, the Voice Command Recognizer may enhance voice recognition by analyzing image data corresponding to a user's lip movement. Therefore, in addition to analyzing audio data captured by audio components, the Voice Command Recognizer may also analyze image data captured by a camera of a computing device.

In some embodiments, recognizers may also pre-process raw user input such as by translating speech to text or sampling a gesture spatially and rendering the gesture as a two-dimensional image. For example, a gesture may correspond to touches, a finger waving in the air, or motion of a device. The gesturing object, i.e., fingertip on a touchscreen, finger in the air, or device, can be pointillized and sampled in space such that the gesture forms a shape that can be represented as the 2-D image. In some embodiments, the recognizers may utilize a "library" or "dictionary" that maps data corresponding to user input, whether raw or pre-processed, to a higher level command. For instance, a media playing application may incorporate a visual gesture interface wherein particular gestures may be mapped to higher level commands such as skipping to a previous track or stopping play of a current track.

It will be appreciated by those of ordinary skill in the art that a global user input management system could operate equally well in a system having fewer or a greater number of components than are illustrated in FIG. 3. Thus, the depiction of the system 300 in FIG. 3 should be taken as being illustrative in nature and not limiting to the scope of the disclosure.

Figure 4:
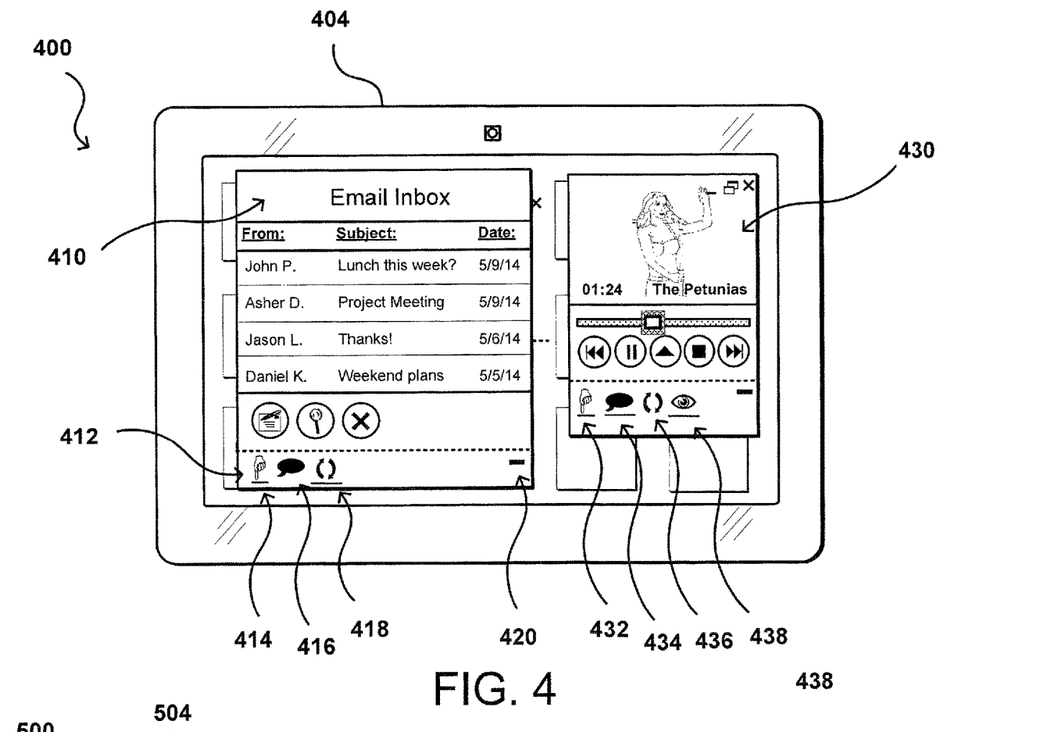
FIG. 4 illustrates an example approach for detecting and managing various user inputs in accordance with an embodiment.

FIG. 4 illustrates an example approach 400 for detecting and managing various user inputs in accordance with an embodiment. In this example, a multi-window multi-tasking environment can be seen. In particular, email application 410 and music player 430 can be seen overlaying a home screen application. A user has interacted with user interface element 420 of the email application to cause display of an input modality interface 412 indicating the types of inputs or modalities supported by the email application, touch gestures as represented by touch icon 414, voice commands as represented by voice icon 416, and device motion as represented by motion icon 418. As seen here, touch icon 414 and motion icon 418 are underlined to indicate that the email application has registered with a global input management service for these types of user input while voice icon 416 is not underlined to indicate that the email application has not been registered with the global input management service for voice commands. In various embodiments, whether a user application registers a particular input modality supported by the application can be based on the state of the application and other executing applications, propagation rules, user preferences, or some combination thereof. For example, in one embodiment, the user application can issue a propagation rule that declares that a particular input modality should be supported when the application has focus and/or that the input modality can be deactivated when the application does not have focus.

Also illustrated in example 400 is music player 430 similarly exposing an input modality interface indicating the types of user input supported by the music player. Here, the input modalities capable of being recognized by the music player include touch gestures as represented by touch icon 432, voice commands as indicated by voice icon 434, device motions as indicated by motion icon 436, and visual gestures as indicated by visual icon 438. In this example, the music player has registered with the global user input management service to receive touch gestures, voice commands, and visual gestures but not device motions. It will be appreciated that user applications can be capable of supporting other input modalities in various embodiments. For instance, in other embodiments, gestures and commands supported by user applications can be broader. In some embodiments, user applications are not necessarily limited to voice commands and may be capable of responding to auditory commands generally, such as whistles, hand claps, tongue clicks, among others. Input modalities supported by user applications may also be more granular in other embodiments. For instance, visual gestures may be further categorized according to specific user features, such as the user's head, face, eyes, mouth, hand, finger(s), arms, legs, among others.

Provision of an input modality interface, such as interface 412, can be advantageous for users. A user may select or unselect certain modes of input for each user application to customize how she interacts with the device. For example, a user may have elected for voice commands to bypass email application 410 and/or selected voice commands to be received by music player 430 in order to concurrently interact with both applications. The user could maximize the graphical user interface corresponding to the email application on the touchscreen yet continue to interact with the music player via voice command. In addition, these user settings can be automatically saved for future use.

Figure 5:
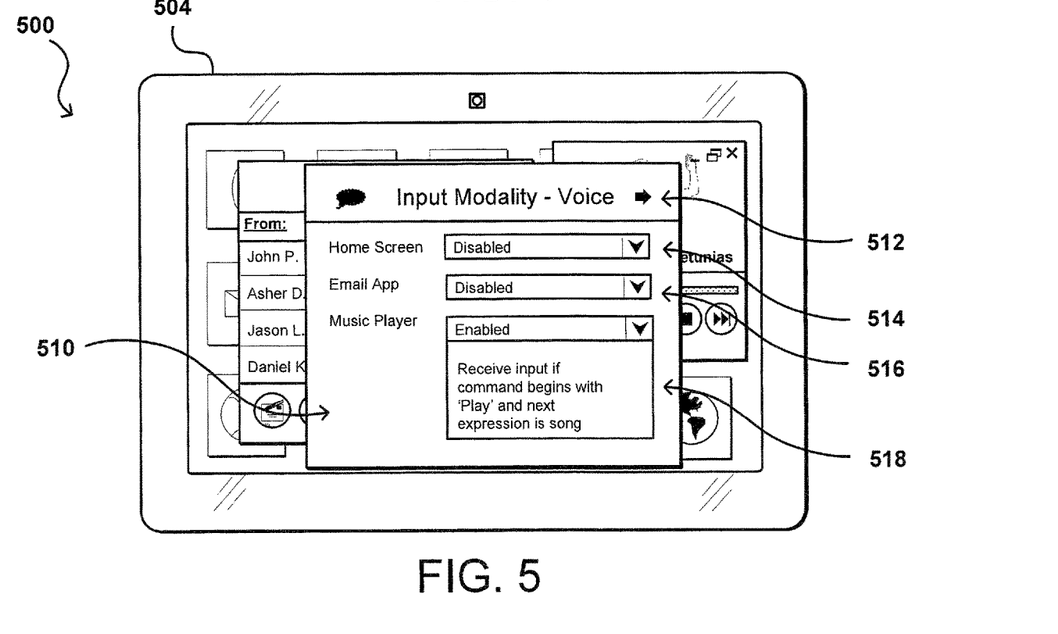
FIG. 5 illustrates an example approach for configuring a system for detecting and managing various user inputs in accordance with an embodiment.

FIG. 5 illustrates an example approach 500 for configuring a system for detecting and managing various user inputs in accordance with an embodiment. In this example, a user application 510 enabling a user to modify input modalities is depicted. In particular, shown is an approach for a user to change the settings for how voice commands may be directed to user applications. User interface element 512 is provided to enable the user to modify other input modalities by swiping to a new page or screen of application 510. In this example, the user applications listed in the first screen of application 510 are dynamically generated based on the user applications currently executing on the device. In other embodiments, every user application can be listed to provide the user more control over how she may interact with each application. In this example, user interface elements 514 and 516 indicate that voice commands have been disabled respectively for a home screen application and an email application. Voice commands are enabled for the music player and an example of a propagation rule 518 is provided as another selection for the user.

As mentioned, propagation rules can be used by a global user input management system to determine how to distribute user inputs that have been received and recognized by the system. Propagation rules can be defined by the device platform, user applications, or the user in various embodiments. An example of a propagation rule is to broadcast a type of user input to any executing application that has registered for that type of input. As another example, a propagation rule can forward a user input to the last active user application supporting the type of the user input. Some rules, such as rule 518, may require certain content to be included in the user input or a certain format for the user input in order to be propagated to a user application. Content can include keywords, image data, gestures, a change in sensor data meeting certain thresholds, among others. For example, a keyword could be a name of the application or a voice command that pertains to the application. A user application that is only interested in facial movement may require that the image data includes at least one instance of a person's face. Similar to keywords, certain gestures can act as a cue or indicator that the user intends for input to be directed to a specific application. A specified format for a propagation rule can be defined using a template, such as a phrase pattern for a voice command or a gesture pattern for a touch gesture or visual gesture. Propagation rules can also be based on threshold lengths of time (minimum and/or maximum). Certain propagation rules can depend on the state of an executing application, such as bypassing a user application when the application is in a paused or suspended state. Other propagation rules may be based on the detected command or gesture being within threshold confidence levels. Propagation rules can also be based on a priority of each executing application as determined by a category of the application (e.g., business, finance, games), a time the user last directly interacted with the application, the percentage of a display screen corresponding to the application, the frequency of usage of the application, among others. A propagation rule may dictate that a certain command or gesture or a type of command or gesture is "monolithic" and is to be propagated to every executing application. Various other examples should be apparent in light of the teachings and suggestions contained herein.

Figure 6:
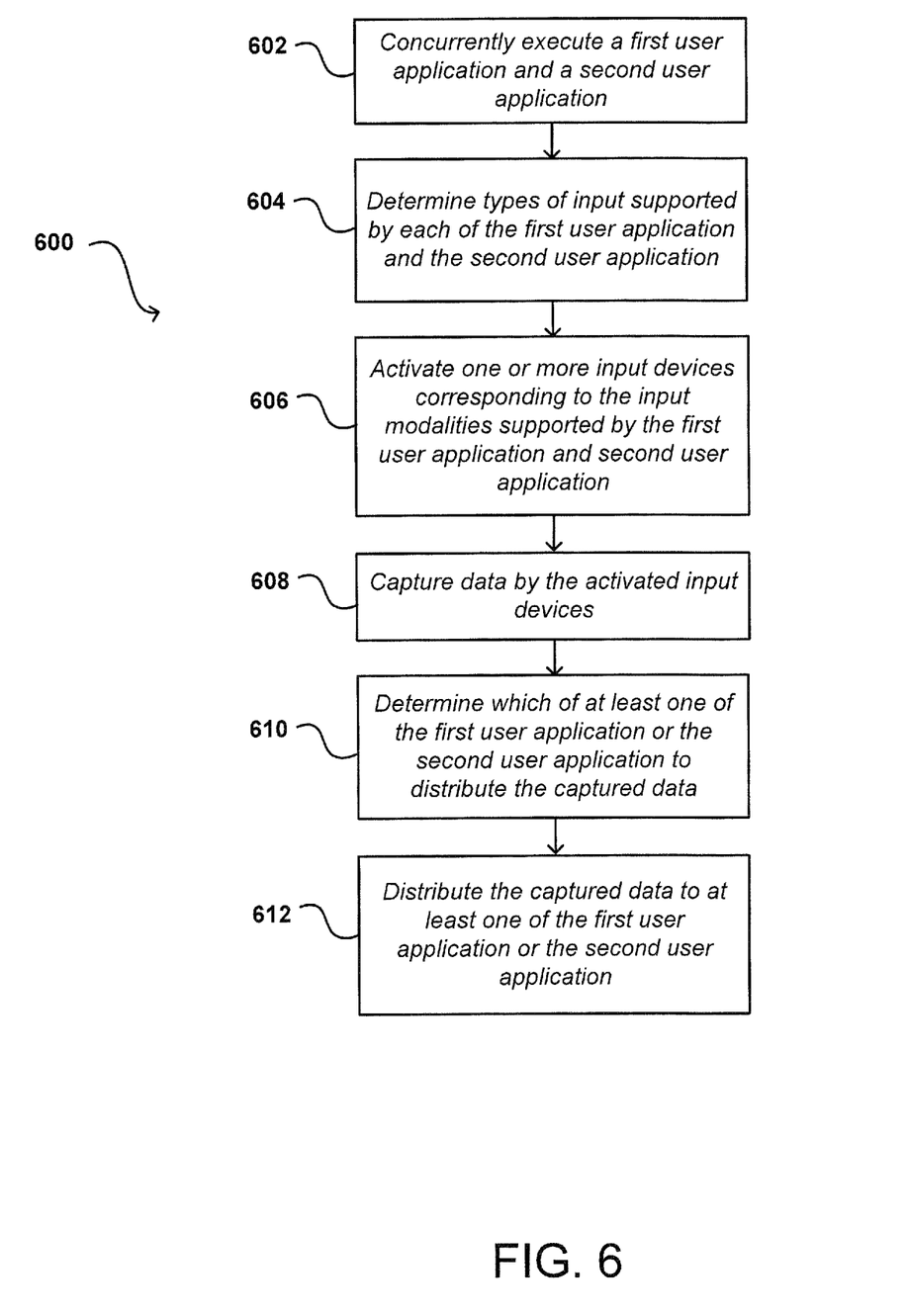
FIG. 6 illustrates an example process for detecting and managing various user inputs in accordance with an embodiment.

FIG. 6 illustrates an example process 600 for detecting and managing various user gesture or commands in accordance with an embodiment. It should be understood that, for any process discussed herein, there can be additional, fewer, or alternative steps performed in similar or alternative orders, or in parallel, within the scope of the various embodiments unless otherwise stated. In this example, the process begins with concurrent execution of at least a first user application and a second user application 602 on a computing device. In some embodiments, the user applications may each include their own respective graphical user interfaces, which can be displayed simultaneously on a screen of the computing device. In other embodiments, one user application may be operating in the foreground, and another user application may be concurrently executing in the background. For each executing user application, the device may determine one or more input modalities or types of user input supported by the application 604. For example, an application may accept auditory commands (e.g., voice commands, whistles, hand claps, finger snaps, or other sounds); device motions (e.g., rotations, translations, and other device gestures); and/or visual gestures (e.g., facial expressions or movements, hand or finger gestures, other user feature gestures). When a user application is started up, the application may register the input modalities or types of user input supported by the application. The system may activate the appropriate software and hardware for detecting the user input corresponding to the modalities supported by the user application 606. For instance, a microphone can be activated if an application supports auditory commands, one or more inertial sensors can be activated if an application supports device motions as user input, and/or one or more cameras can be activated if an application supports visual gestures.

In some embodiments, certain input modalities may only be available when an application has focus or is directly being interacted with by the user. For example, two user applications may be concurrently executing on a device and a first application supports a touch interface and the second application does not support a touch interface. When the first application has focus, touch-related software and/or hardware may be activated to monitor touch interactions. However, when the second application has focus (or the first application is sent to the background), the touch software and/or hardware may be deactivated. Such an approach can potentially conserve power and free computing resources for active processes. A user application can declare, via a propagation rule, whether a certain input modality should be available when the application has focus, such as via touch, and/or whether an input modality should always be available even when the application is running in the background, such as via audio command or visual gesture. When a type of input should only be available under certain conditions, the global user input management system can monitor those conditions and deactivate software and/or hardware when those conditions are not met.

Further, the device may monitor for user input corresponding to the modalities supported by each executing user application (and when certain conditions are met) by capturing input data using a sensor or other input device corresponding to the supported modalities 608. In some embodiments, the input data must be capable of being responded to meaningfully by the user application. For example, a user application that does not recognize voice commands can hypothetically have voice data forwarded to the application. Such a user application may simply discard the voice data as it would be unintelligible by the user application. Such a response however is not a meaningful response as used herein. As another example, two user applications may be capable of recognizing touch gestures as a general matter. However, a touch outside of a window corresponding to a user application in a multi-window environment or a touch while a user application is in the background would not be meaningfully responded to by that user application.

In some embodiments, user applications may be multi-modal and one of the types of input supported by such applications may be de-selected. For instance, a user may be operating a word processor and a music player concurrently. The word processor and the music player may each include a touch-based interface as well as support voice commands. The user may wish to operate the word processor using the touch-based interface of the word processor and the music player using the voice-based interface of the music player. The user may configure the word processor to bypass voice commands. Using such an approach, the user may interact with the word processor via the touch-based interface without having to switch between the graphical user interface of the word processor and the graphical user interface of the music player. Further, the user can maximize the graphical user interface of the word processor while still being able to control the music player via voice command. Thus, the settings of the types of input corresponding to the types of user input supported by a user application can be configured by the user, and determination of the state of the user application can include identification of such settings.

In this example process, the device may determine at least one of the user applications for receiving data corresponding to the user input 610. In some embodiments, user input data can be pre-processed by the device and forwarded to a suitable user application. For example, audio data captured by a microphone of a device can be pre-processed by converting the audio data from an analog format to a digital format, converting digital voice data and/or mapping a voice command encapsulated in the audio data to a higher level command to the device. As another example, visual gestures can be pre-processed by pointillizing an object to be tracked for gesture recognition, sampling the tracked point/object in space, converting the sampled data to a 2-D image, and mapping the image to a higher-level command from a gesture dictionary or library. In some embodiments, pre-processing can include classifying or identifying the user input and correlating the user input to a higher level command. In other embodiments, the raw sensor data (e.g., voice data, image data, motion data) captured by the device can be forwarded to interested applications. In still other embodiments, an intermediate form of the user input can be forwarded to user applications, such as text corresponding to voice data or motion data corresponding to visual gestures.

In some embodiments, determination of the user application for receiving data corresponding to the user input can be based at least in part on a set of propagation rules. For example, one propagation rule may be based on ranking or prioritizing each executing user application for receiving user input. The ranking or sorting of user applications according may be based on a category of each user application, the last time the user directly interacted with each user application, the frequency of usage of each application, or the percentage of a display screen taken up by each application, among others. Another propagation rule may be based on the content of the user input, such as the user input including a cue or indicator or conforming to a specified format. Propagation rules can also direct the user input to be broadcast to multiple user applications. Various other examples should be apparent in light of the teachings and suggestions contained herein. After one or more of the user applications have been selected for receiving the data corresponding to the user input, the device can propagate the data to the selected user application(s) 612 and the user application may perform an action in response to receiving the data corresponding to the user input.

Figure 7:
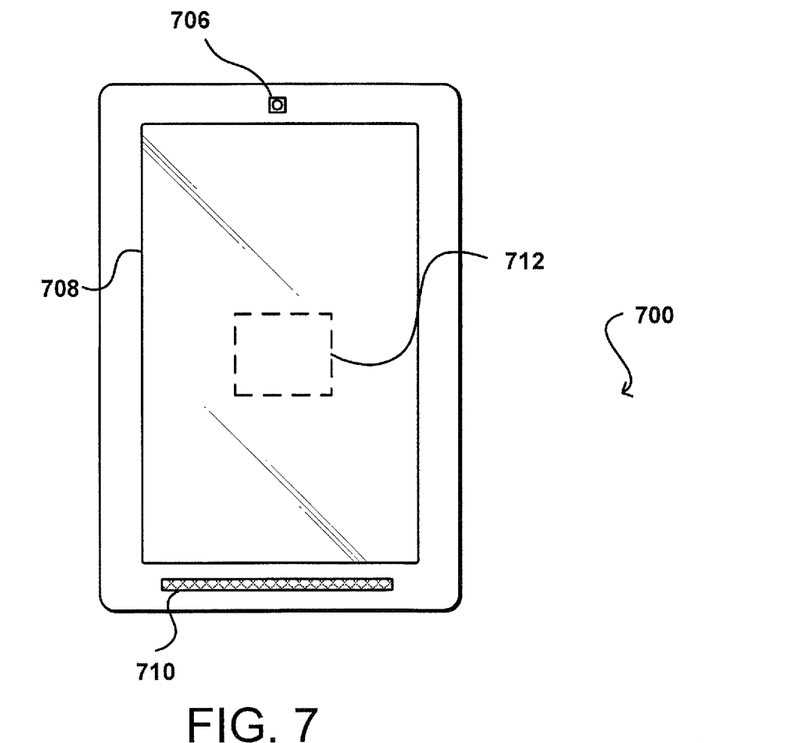
FIG. 7 illustrates an example of a computing device that can be used in accordance with various embodiments.

FIG. 7 illustrates an example computing device 700 that can be used to perform approaches described in accordance with various embodiments. In this example, the computing device includes a camera 706 located at the top of a front face of the device and on the same surface as the display element 708, and enabling the device to capture images in accordance with various embodiments, such as images of a user viewing the display element and/or operating the device. The computing device includes audio input element 710, such as a microphone, to receive audio input from a user. The computing device also includes an inertial measurement unit (IMU) 712, comprising a three-axis gyroscope, three-axis accelerometer, and magnetometer, that can be used to detect the motion of the device, from which position and/or orientation information can be derived.

Figure 8:
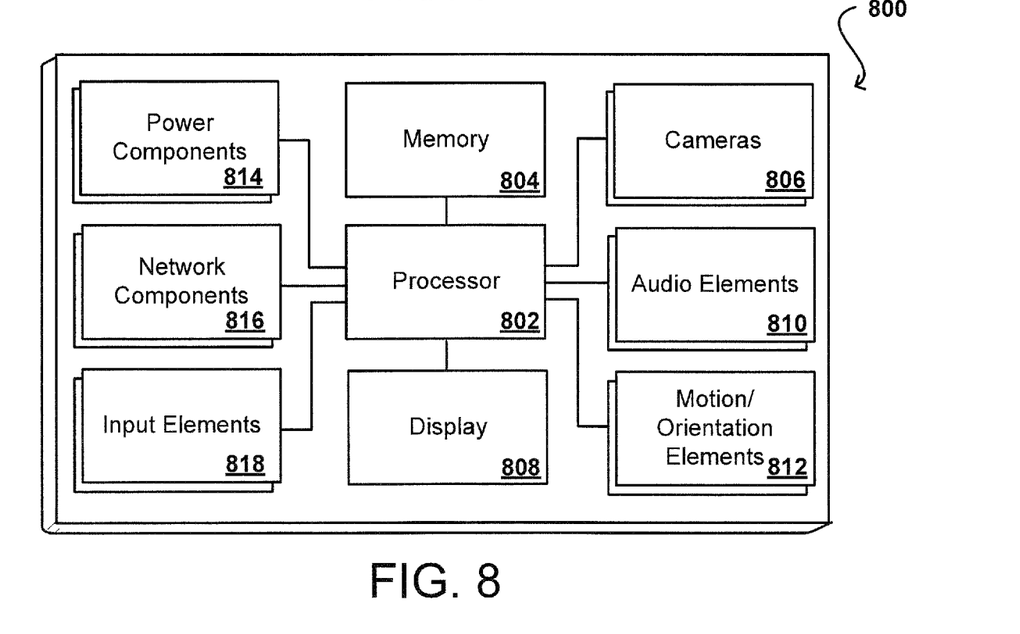
FIG. 8 illustrates an example configuration of components of a computing device such as that illustrated in FIG. 7.

FIG. 8 illustrates a logical arrangement of a set of general components of an example computing device 800 such as the device 700 described with respect to FIG. 7. In this example, the computing device includes a processor 802 for executing instructions that can be stored in a memory element 804. As would be apparent to one of ordinary skill in the art, the computing device can include many types of memory, data storage, or non-transitory computer-readable storage media, such as a first data storage for program instructions for execution by the processor 802, a separate storage for images or data, a removable memory for sharing information with other computing devices, etc. The computing device typically will include some type of display element 808, such as a touchscreen, electronic ink (e-ink), organic light emitting diode (OLED), liquid crystal display (LCD), etc., although computing devices such as portable media players might convey information via other means, such as through audio speakers. In at least some embodiments, the display screen provides for touch or swipe-based input using, for example, capacitive or resistive touch technology. As discussed, the computing device in many embodiments will include one or more cameras or image sensors 806 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the computing device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a computing device can include the ability to start and/or stop image capture, such as when receiving a command from a user, application, or other computing device. The example computing device can similarly include at least one audio component, such as a mono or stereo microphone or microphone array, operable to capture audio information from at least one primary direction. A microphone can be a uni- or omni-directional microphone as known for such components.

The computing device 800 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 814 known in the art for providing power to a computing device, which can include capacitive charging elements for use with a power pad or similar component. The computing device can include one or more communication elements or networking sub-systems 816, such as a Wi-Fi, Bluetooth, RF, wired, or wireless communication system. The computing device in many embodiments can communicate with a network, such as the Internet, and may be able to communicate with other computing devices. In some embodiments the computing device can include at least one additional input component 818 able to receive conventional input from a user. This conventional input component can include, for example, a push button, touch pad, touchscreen, wheel, joystick, keyboard, mouse, keypad, or any other such component or element whereby a user can input a command to the computing device. In some embodiments, however, such a computing device might not include any buttons at all, and might be controlled only through a combination of visual and audio commands, such that a user can control the device without having to be in contact with the computing device.

The computing device 800 also can include one or more orientation and/or motion determination sensors 812. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the computing device. The computing device can include other elements as well, such as may enable location determinations through triangulation or another such approach. These mechanisms can communicate with the processor 802, whereby the computing device can perform any of a number of actions described or suggested herein.

In some embodiments, the computing device 800 can include the ability to activate and/or deactivate detection and/or command modes, such as when receiving a command from a user or an application, or retrying to determine an audio input or video input, etc. For example, a computing device might not attempt to detect or communicate with other computing devices when there is not a user in the room. If a proximity sensor of the computing device, such as an IR sensor, detects a user entering the room, for instance, the computing device can activate a detection or control mode such that the device can be ready when needed by the user, but conserve power and resources when a user is not nearby.

In some embodiments, the computing device 800 may include a light-detecting element that is able to determine whether the computing device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the computing device. For example, if the computing device is unable to detect a user's view location and a user is not holding the computing device but the computing device is exposed to ambient light, the computing device might determine that it has likely been set down by the user and might turn off the display element and disable certain functionality. If the computing device is unable to detect a user's view location, a user is not holding the computing device and the computing device is further not exposed to ambient light, the computing device might determine that the computing device has been placed in a bag or other compartment that is likely inaccessible to the user and thus might turn off or disable additional features that might otherwise have been available. In some embodiments, a user must either be looking at the computing device, holding the computing device or have the computing device out in the light in order to activate certain functionality of the computing device. In other embodiments, the computing device may include a display element that can operate in different modes, such as reflective (for bright situations) and emissive (for dark situations). Based on the detected light, the computing device may change modes.

In some embodiments, the computing device 800 can disable features for reasons substantially unrelated to power savings. For example, the computing device can use voice recognition to determine people near the computing device, such as children, and can disable or enable features, such as Internet access or parental controls, based thereon. Further, the computing device can analyze recorded noise to attempt to determine an environment, such as whether the computing device is in a car or on a plane, and that determination can help to decide which features to enable/disable or which actions are taken based upon other inputs. If speech or voice recognition is used, words can be used as input, either directly spoken to the computing device or indirectly as picked up through conversation. For example, if the computing device determines that it is in a car, facing the user and detects a word such as "hungry" or "eat," then the computing device might turn on the display element and display information for nearby restaurants, etc. A user can have the option of turning off voice recording and conversation monitoring for privacy and other such purposes.

In some of the above examples, the actions taken by the computing device relate to deactivating certain functionality for purposes of reducing power consumption. It should be understood, however, that actions can correspond to other functions that can adjust similar and other potential issues with use of the computing device. For example, certain functions, such as requesting Web page content, searching for content on a hard drive and opening various applications, can take a certain amount of time to complete. For computing devices with limited resources, or that have heavy usage, a number of such operations occurring at the same time can cause the computing device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the computing device can have sufficient processing capability, and the camera and associated image analysis algorithm(s) may be sensitive enough to distinguish between the motion of the computing device, motion of a user's head, motion of the user's eyes and other such motions, based on the captured images alone. In other embodiments, such as where it may be desirable for an image process to utilize a fairly simple camera and image analysis approach, it can be desirable to include at least one motion and/or orientation determining element that is able to determine a current orientation of the computing device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a computing device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the computing device at a fixed orientation (e.g. distance, angle, etc.) to the user and the user changes orientation to the surrounding environment, analyzing an image of the user alone will not result in detecting a change in an orientation of the computing device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the computing device can determine that the computing device has changed orientation, even though the orientation of the computing device with respect to the user has not changed. In other embodiments, the computing device may detect that the user has moved with respect to the device and adjust accordingly. For example, if the user tilts their head to the left or right with respect to the computing device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These computing devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network component may be stored locally and/or remotely, as appropriate. Where a system includes computerized devices, each such device can include hardware elements that may be electrically coupled via a bus, the elements including, for example, at least one central processing unit (CPU), at least one input element (e.g., a mouse, keyboard, controller, touch-sensitive display element or keypad) and at least one output element (e.g., a display screen, printer, or speaker). Such a system may also include one or more storage components, such as disk drives, optical storage components and solid-state storage systems such as random access memory (RAM) or read-only memory (ROM), as well as removable media components, memory cards, flash cards, etc.

Such computing devices can also include a computer-readable storage media reader, a communications component (e.g., a modem, a network card (wireless or wired), an infrared communication element), and working memory, as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   one or more processors;
   one or more microphones;
   one or more cameras; and
   memory including instructions that, when executed by the one or more processors, cause the computing system to:
      execute a first application of the computing system;
      execute a second application of the computing system during a first period of time in which the first application is also executed;
      capture audio data during the first period of time using the one or more microphones;
      capture image data during the first period of time using the one or more cameras;
      process the audio data to identify a first keyword;
      process the image data to identify a first gesture;
      determine that the first keyword corresponds to the first application, and the first gesture corresponds to the second application;
      send, based on the first keyword corresponding to the first application, a first command to the first application; and
      send, based on the first gesture corresponding to the second application, a second command to the second application.

2. The computing system of claim 1, further comprising further instructions that, when executed by the one or more processors, further cause the computing system to:
receive, from the first application, a registration of the first keyword.

3. The computing system of claim 2, further comprising further instructions that, when executed by the one or more processors, further cause the computing system to:
prioritize the first application for receiving the first command over the second application receiving the second command.

4. A computer-implemented method, comprising:
associating one or more first keywords with a first application;
associating one or more second gestures with a second application;
executing the first application on a computing device during a first period of time in which the second application is also executed on the computing device;
receiving audio input data captured during the first period of time by one or more audio input components of the computing device;
receiving image data captured during the first period of time by one or more cameras of the computing device;
processing the audio input data to identify a first keyword;
processing the image data to identify a first gesture;
determining that the first keyword corresponds to the first application, and the first gesture corresponds to the second application;
sending, based on the first keyword corresponding to the first application, a first command to the first application; and
sending, based on the first gesture corresponding to the second application, a second command to the second application.

5. The computer-implemented method of claim 4, wherein the image data corresponds to lip movement, the method further comprising:
analyzing the audio input data and the image data corresponding to lip movement to enhance recognition of the audio input data.

6. The computer-implemented method of claim 4, further comprising:
determining that the first application has focus; and
determining that the second application does not have focus.

7. The computer-implemented method of claim 4, further comprising:
receiving, from the first application, a registration of the one or more first keywords.

8. The computer-implemented method of claim 7, further comprising:
prioritizing the first application for receiving the first command over the second application receiving the second command.

9. The computer-implemented method of claim 8, further comprising:
setting a prioritization of the first application over the second application based at least in part upon a category of the first application, a time a user last directly interacted with the first application, a percentage of a display screen corresponding to the first application, or a frequency of usage of the first application.

10. The computer-implemented method of claim 4, further comprising:
capturing second input data using a second input component of the computing device; and
processing the second input data to increase a confidence level associated with identifying the first keyword.

11. A non-transitory computer-readable storage medium storing instructions, the instructions when executed by a processor causing a computing device to:
associate one or more first keywords with a first application;
associate one or more second gestures with a second application;
execute the first application on the computing device during a first period of time in which the second application is also executed on the computing device;
receive audio input data captured during the first period of time by one or more audio input components of the computing device;
receive image data captured during the first period of time by one or more cameras of the computing device;
process the audio input data to identify a first keyword;
process the image data to identify a first gesture;
determine that the first keyword corresponds to the first application, and the first gesture corresponds to the second application;
send, based on the first keyword corresponding to the first application, a first command to the first application; and
send, based on the first gesture corresponding to the second application, a second command to the second application.

12. The non-transitory computer-readable storage medium of claim 11, wherein the image data corresponds to lip movement, further comprising further instructions that, when executed by the processor, further cause the computing device to:
analyze the audio input data and the image data corresponding to lip movement to enhance recognition of the audio input data.

13. The non-transitory computer-readable storage medium of claim 11, further comprising further instructions that, when executed by the processor, further cause the computing device to:
determine that the first application has focus; and
determine that the second application does not have focus.

* * * * *